Figure 1:
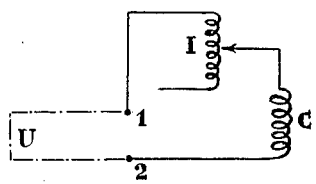

Sept. 12, 1933.  J. ACHARD  1,926,507
ELECTRICAL INDUCTION APPARATUS, APPLICABLE TO RESISTANCE WELDING
Filed May 17, 1929  2 Sheets-Sheet 1

Inventor
Jean Achard
by
Robert W Byerly
his attorney

Sept. 12, 1933.   J. ACHARD   1,926,507
ELECTRICAL INDUCTION APPARATUS, APPLICABLE TO RESISTANCE WELDING
Filed May 17, 1929   2 Sheets-Sheet 2
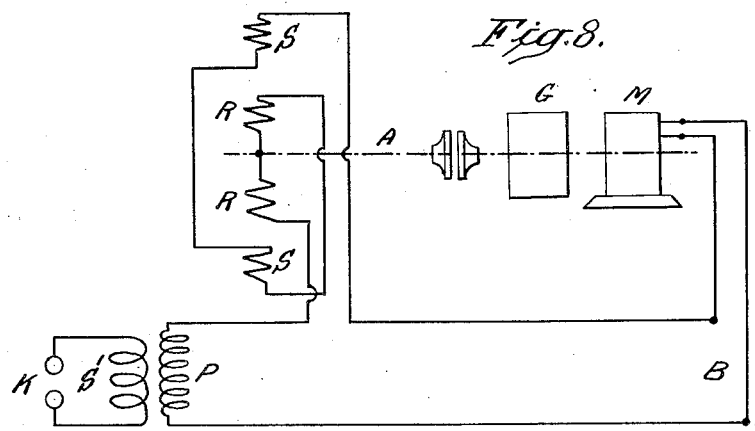
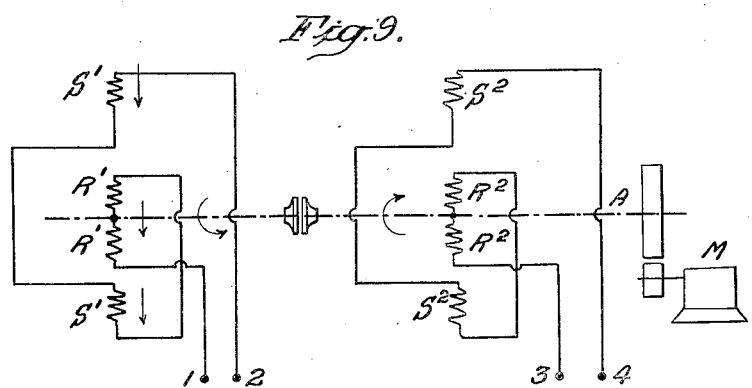
INVENTOR
Jean Achard
BY
Robert W Byerly
ATTORNEY Patented Sept. 12, 1933

1,926,507

UNITED STATES PATENT OFFICE 1,926,507

ELECTRICAL INDUCTION APPARATUS, APPLICABLE TO RESISTANCE WELDING

Jean Achard, Paris, France

Application May 17, 1929, Serial No. 363,806, and in France November 26, 1928

4 Claims. (Cl. 219—4)

Experience has shown that in electric resistance welding, described as continuous welding (either in seam, lap or butt-welding wherein the parts are pressed together), it is desirable to make and break the current at a suitable frequency, say from 3 to 20 times per second.

These repeated interruptions of the current are for the purpose of avoiding expansion and consequent deformation of the metal pieces to be welded.

These interruptions of the current also have an especial advantage by ensuring a free contact and allowing a sound weld to be effected in the case of metals which have been imperfectly cleaned or prepared.

Moreover, they have the advantage of effecting a homogeneous welding since, the pressure being continuous, the fusion of the molecules of the metal, that is to say, the welding proper, is carried on or takes place more intimately between the heating periods which correspond to passage of the current.

These principles are well known to experts in electric welding but, in order to produce these interruptions of current heretofore, in a general way, mechanical circuit breakers have been employed mounted, for example, at the terminals of the primary of a transformer of the welding machine. In these circuit breakers the contact is established either through plate, roller or rubbing contacts. These circuit breakers operate either in air or in an oil bath, and may comprise a magnetic blow-out in order to diminish the effects of the arc on breaking.

It should be observed that these different systems can only be employed for low powers, in general less than 20 kw. They have the disadvantage that the contacts are soon put out of operation, the said contacts not resisting the effects of the sudden and rapid breaks, and thus they have to be very frequently renewed.

The use of these arrangements also brings out other disadvantages which are still more serious; in consequence of the deterioration of the contacts, the current no longer passes; or even, on the contrary, seizing may occur and then rupture or breaking of the current cannot be effected. The welding is then irregular if not frankly bad.

The arrangements forming the subject of this invention effect the variation of the secondary current in a manner or degree sufficient for practical purposes without having to resort to interruption of the primary current.

Figure 2:
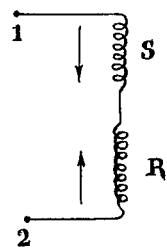
Figure 3:
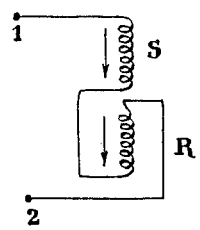
Figure 4:
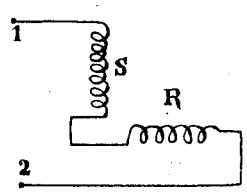
Figure 5:
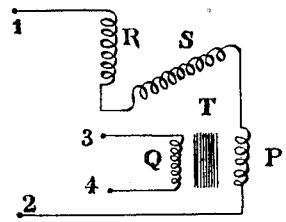
Figure 6:
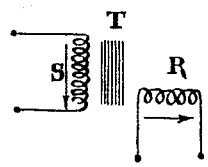
Figure 7:
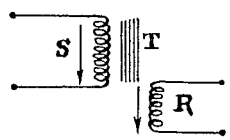

Fig. 1 illustrates diagrammatically an electrical circuit having a variable impedance in series therewith, Fig. 2 illustrates diagrammatically an induction motor circuit wherein the fields of the rotor and stator oppose one another, Fig. 3 illustrates diagrammatically an induction motor circuit wherein the fields of the rotor and stator augment one another, Fig. 4 illustrates diagrammatically an induction motor circuit wherein the resultant of the fields of the rotor and stator is intermediate that of Figs. 2 and 3, Fig. 5 illustrates diagrammatically the induction motor circuit of Figs. 2, 3 and 4 used as a regulating means in the primary of a welding transformer, Figs. 6 and 7 illustrate diagrammatically different relative positions of a rotor and stator of an induction motor used directly as a variable coupling welding transformer, Fig. 8 illustrates diagrammatically a practical mechanical embodiment of the schematic illustration of Fig. 5, and Fig. 9 illustrates diagrammatically a balanced mechanical system wherein two induction motors utilized as current regulating means in an electrical circuit are mounted on and driven by a single shaft.

These improved arrangements are based upon the following observations, illustrated in Fig. 1 of the accompanying drawings.

If in a circuit C carrying an alternating current there is inserted, in series, a variable impedance or resistance I and a consuming circuit U, the power available at the terminals 1, 2 of the consuming circuit varies inversely to this impedance.

In principle the invention consists in substituting for the circuit breaker of electric resistance welding machines, a circuit having a variable impedance or resistance placed in series with the consuming circuit.

In practice the invention can be carried into practice in various ways of which examples are hereinafter given:

It should first be remembered that if, in an induction motor with a wound rotor R, wherein transformation ratio is approximately unity, the rotor R and the stator S are disposed in such a manner that the fields balance one another, Fig. 2, the total impedance is very small. On the contrary if the rotor is disposed with reference to the stator in such a manner that the fields augment one another, Fig. 3, the resulting impedance is large.

By varying the position of the rotor relatively to the stator, a variable impedance is obtained, between a maximum and a minimum, passing through all the intermediate values.

One method of carrying the invention into practice consists in placing in series with the primary winding of a welding machine transformer, a circuit of variable impedance as in Figures 2, 3 and 4.

There is thus effectively installed an induction motor wherein the rotor R, the stator S and the consuming circuit are placed in series. By movement of the rotor relatively to the stator the impedance of the circuit can be varied between a maximum and a minimum, whilst the power of the consuming circuit itself varies between a minimum and a maximum.

A diagram of the principle of such an arrangement is shown in Figure 5 of the drawings in which P indicates the primary of the transformer T and Q the secondary. It is then possible to vary the voltage in the primary, and in consequence the voltage in the secondary available at the terminals 3, 4, between a maximum and a minimum corresponding practically to closing and opening the secondary circuit, this being attained without breaking the primary current.

To obtain this variation, the rotor of the induction motor may be turned mechanically by any convenient mechanical power. Thus, in Fig. 8, I have indicated diagrammatically an arrangement in which an electric motor M of any type is connected through a clutch G or other transmission apparatus to the shaft A of the rotor R of the induction motor, whose rotor R and stator S are connected in series between a source of alternating current B (such as the terminals of an alternating current generator), and the primary P of a transformer whose secondary S' is connected to the terminals K of the welding apparatus. The motor M may also be driven by current supplied from the source B as illustrated, although this is, of course, not essential.

In some cases, for welding, it is desirable at once to construct a variable coupling transformer, the latter can be formed by an induction motor, the primary being connected to a rotor wound for a voltage corresponding to that of the supply from an exterior alternating current network whereby the apparatus can be actuated. This rotor is capable of moving relatively to a stator winding forming the secondary working circuit of the welding machine, the current available at the terminals of this secondary circuit being directly utilizable for welding, Figures 6 and 7.

It is evident that the current induced in the stator S by the primary R formed by a rotor, depends on the relative position of the windings; this current will be in the neighbourhood of zero when the two windings are at right angles, Figure 6, and will become a maximum when the two windings are on the same axis, Figure 7.

It is desirable to balance two systems similar to those in Figures 4, 6, and 7; these systems being coupled on the same axis so as to avoid having to overcome mechanical efforts in order to rotate the rotors relatively to the stators. The electro-dynamic effects are annulled and the necessary efforts for causing rotation of the rotors in the stators are reduced to the mechanical losses of the system alone. The rotors as well as the stators can be set up either in parallel or in series, or in a combination of these two types of arrangement. It is only necessary that the windings should be connected in a suitable manner in each case.

Such balancing of systems of the type shown in Figs. 5 and 8 is illustrated in Fig. 9. Fig. 9 illustrates two induction motors mounted on a common shaft A, which is rotated by a gearing or other connection with a motor M or other mechanical power. The rotor R1 and stator S1 of one of the induction motors are connected in series between the terminals 1, 2, while the rotor R2 and stator S2 of the other induction motor are connected in series between the terminals 3, 4, so that the coils of each induction motor form a variable impedance as the shaft A is rotated. The two induction motors are so arranged that the electro-magnetic force couples between their rotors and stators act about the shaft A in opposite directions, so that, in order to rotate the shaft A, the motor M is required to overcome only such frictional resistance as may be present.

The invention is not limited to its application to electric resistance welding. Its scope can be extended to all cases where it is desirable to periodically reduce a polyphase current practically to zero without actually breaking the circuit in which the current is flowing or a circuit inductively linked therewith, the object of the invention being to avoid the inconveniences and defects of operation due to the employment of mechanical circuit breakers used with transformers which require repeated and frequent making and breaking of the current.

I claim:—

1. A device for furnishing a periodically varying current in a working circuit, comprising a mechanically-driven induction motor having a stator and a rotor, one of which is connected to a source of alternating current and the other of which is connected to the working circuit, so that the motor serves as a varying coupling transformer.

2. An electrical device of the type described, comprising two variable impedance circuits, each having a rotor and a stator, the two rotors being so mounted on the same mechanically-driven shaft that their electro-magnetic force couples about said shaft compensate each other.

3. In electric resistance welding, the combination with a welding transformer and a source of supply of alternating current therefor, of a mechanically driven induction motor having the windings of its rotor and stator connected in series with each other between the source of current and the primary of the transformer.

4. In electric resistance welding, the combination with a welding transformer in a source of supply of alternating current, of two induction coils connected in series with each other between said source and the primary of said transformer, and means for periodically changing the relative position of said induction coils between a position in which their magnetic fields balance one another and a position in which their magnetic fields augment one another.

JEAN ACHARD.